United States Patent
Moore

(10) Patent No.: US 10,325,078 B2
(45) Date of Patent: Jun. 18, 2019

(54) SOFTWARE LICENSE MANAGEMENT IMPACT ANALYSIS

(75) Inventor: Bradley T. Moore, Dana Point, CA (US)

(73) Assignee: International Business Machines Corporation, Armonk, NY (US)

( * ) Notice: Subject to any disclaimer, the term of this patent is extended or adjusted under 35 U.S.C. 154(b) by 1989 days.

(21) Appl. No.: 12/616,212

(22) Filed: Nov. 11, 2009

(65) Prior Publication Data

US 2011/0113493 A1 May 12, 2011

(51) Int. Cl.
*G06F 21/10* (2013.01)

(52) U.S. Cl.
CPC .................. *G06F 21/105* (2013.01)

(58) Field of Classification Search
USPC ..................................... 705/50–79
See application file for complete search history.

(56) References Cited

U.S. PATENT DOCUMENTS

| 5,754,763 | A * | 5/1998 | Bereiter .................. G06F 21/10 705/59 |
| 7,003,560 | B1 * | 2/2006 | Mullen et al. ................. 709/223 |
| 7,055,040 | B2 * | 5/2006 | Klemba et al. ............... 713/156 |
| 2008/0148253 | A1 * | 6/2008 | Badwe .................... G06F 21/10 717/174 |
| 2008/0183626 | A1 * | 7/2008 | Romero ................ G06F 21/105 705/59 |
| 2010/0205303 | A1 * | 8/2010 | Chaturvedi ............. G06F 21/10 709/226 |
| 2011/0016467 | A1 * | 1/2011 | Kane .................. 718/1 |

OTHER PUBLICATIONS

"Six Steps of Completing a s Software Audit and Ensuring Compliance—While Saving Money" (published online at http://www.expressmetrix.com/pdf/Six_Steps_to_Completing_Software_a_Audit_and_Ensuring_Compliance.pdf on Jul. 24, 2007).*
IBM "Hierarchy of Methods for Discovering Application Usage in Software License Management" ip.com Prior Art Database, Nov. 17, 2004, www.ip.com/pubview/ipcom000032890d.
IBM "Software Product Development Effective Measurement Tool" ip.com Prior Art Database, Jun. 18, 2009, www.ip.com/pubview/ipcom000184273d.
Jansen-Vullers et al. "Business Process Redesign for Effective E-commerce" Sixth International Conference on Electronic Commerce, 2004, pp. 382-391, ACM.
Theunissen et al. "In Search of the Sweet Spot: Agile Open Collaborative Corporate Software Development" Proceedings of SAICSIT 2005, 2005, pp. 268-277.

* cited by examiner

*Primary Examiner* — James M Detweiler

(74) *Attorney, Agent, or Firm* — Law Office of Jim Boice

(57) ABSTRACT

A computer implemented method, program product, and system for managing software licenses is presented. A licensing management logic executes an initial reconciliation run for an initial system. The licensing management logic detects a change to an initial subunit to create a changed subunit, and executes an impact analysis for the changed subunit. The licensing management logic identifies a subunit reconciliation section from the initial reconciliation run, and executes a subunit reconciliation run for the changed subunit to create a changed subunit reconciliation report. The licensing management logic replaces the initial subunit reconciliation report with the changed subunit reconciliation report to create an updated reconciliation report for a changed system.

9 Claims, 6 Drawing Sheets

SOFTWARE LICENSE MANAGEMENT IMPACT ANALYSIS

BACKGROUND

The present disclosure relates to the field of computers, and specifically to the management of software licenses. Still more particularly, the present disclosure relates to managing changes to licenses when changes to a system occur.

BRIEF SUMMARY

A computer implemented method, program product, and system for managing software licenses is presented. A licensing management logic executes an initial reconciliation run for an initial system. The licensing management logic detects a change to an initial subunit to create a changed subunit, and executes an impact analysis for the changed subunit. The licensing management logic identifies a subunit reconciliation section from the initial reconciliation run, and executes a subunit reconciliation run for the changed subunit to create a changed subunit reconciliation report. The licensing management logic replaces the initial subunit reconciliation report with the changed subunit reconciliation report to create an updated reconciliation report for a changed system.

DETAILED DESCRIPTION

Figure 1:
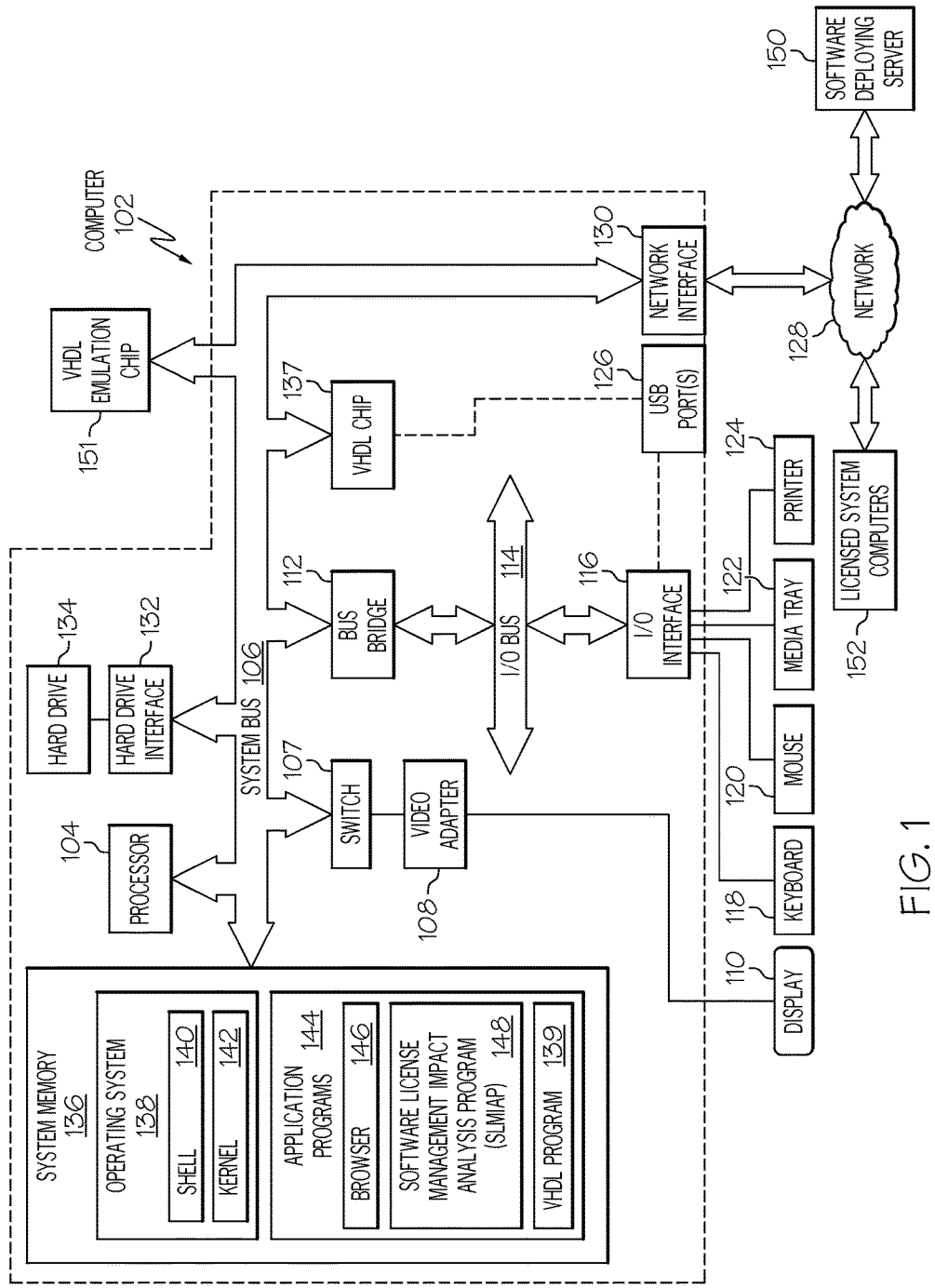
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150 and/or software management server 152, as well as licensing management computer 202, server 206, and clients 208-212 shown in FIGS. 2A-B.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., software license management impact analysis program-SLMIAP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a software license management impact analysis program (SLMIAP) 148. SLMIAP 148 includes code for implementing the processes described below, including those described in FIGS. 2-5. In one embodiment, computer 102 is able to download SLMIAP 148 from software deploying server 150, including in an on-demand basis. Note further that, in one embodiment of the present invention, software deploying server 150 performs all of the functions associated with the present invention (including execution of SLMIAP 148), thus freeing computer 102 from having to use its own internal computing resources to execute SLMIAP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from SLMIAP 148 causes VHDL program 139 to configure VHDL chip 137, which may be an FPGA, ASIC, etc.

In another embodiment of the present invention, execution of instructions from SLMIAP 148 results in a utilization of VHDL program 139 to program a VHDL emulation chip 151. VHDL emulation chip 151 may incorporate a similar architecture as described above for VHDL chip 137. Once SLMIAP 148 and VHDL program 139 program VHDL emulation chip 151, VHDL emulation chip 151 performs, as hardware, some or all functions described by one or more executions of some or all of the instructions found in SLMIAP 148. That is, the VHDL emulation chip 151 is a hardware emulation of some or all of the software instructions found in SLMIAP 148. In one embodiment, VHDL emulation chip 151 is a programmable read only memory (PROM) that, once burned in accordance with instructions from SLMIAP 148 and VHDL program 139, is permanently transformed into a new circuitry that performs the functions needed to perform the process described below in FIGS. 2-5.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2A:
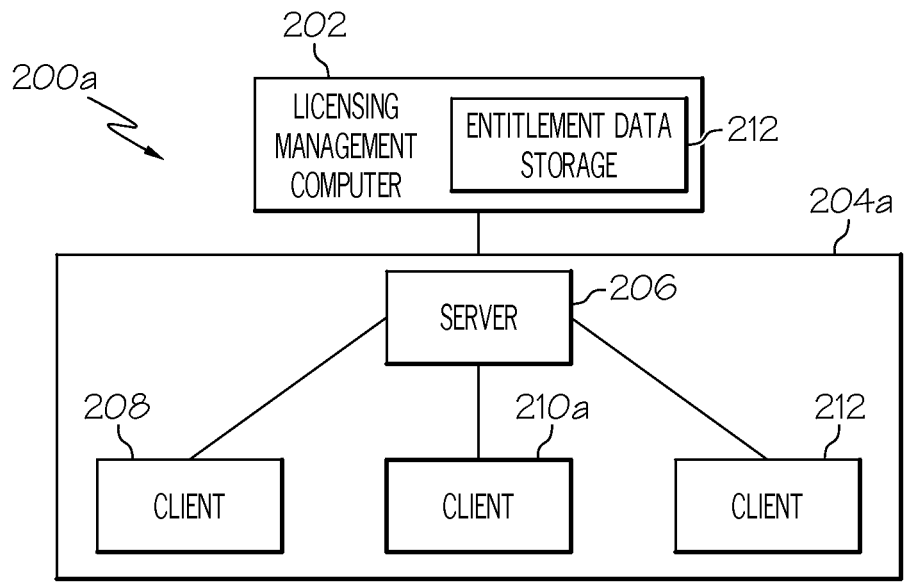
FIG. 2 illustrates an exemplary system in which a change to a subcomponent is occurring.
Figure 2B:
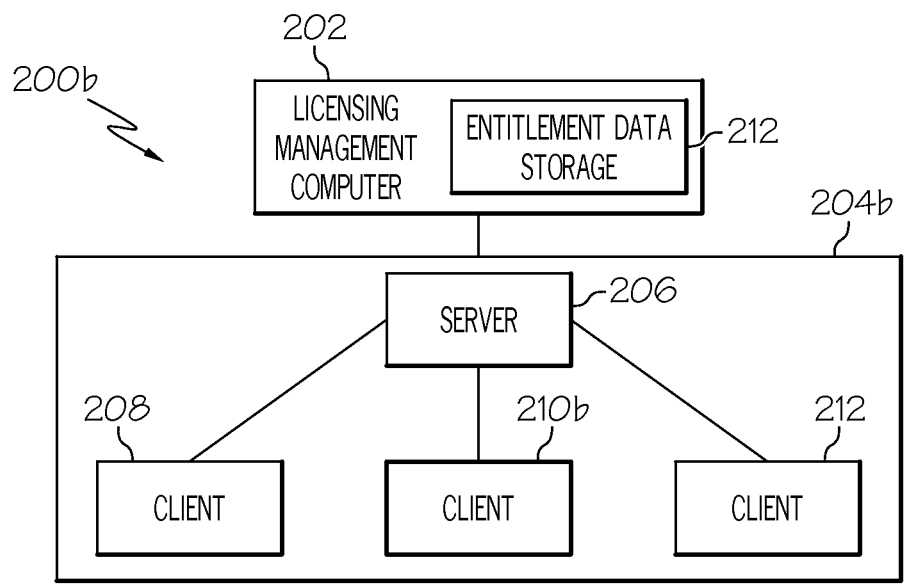

With reference now to FIG. 2A, an exemplary system 200 in which a change to a subcomponent is occurring is presented. System 200a comprises a licensing management computer 202 (e.g., computer 102 shown in FIG. 1), which oversees and reconciles licenses used by a network 204a. Within the network 204a is a server 206, which supports multiple clients 208, 210a, and 212 (where server 206 and clients 208, 210, and 212 make up licensed system computers 152 shown in FIG. 1).

Assume, for exemplary purposes, that client 210a shown in FIG. 2A is going to be changed. This change may be a change to hardware, a change to software, or a fundamental transformation. Examples of changes to hardware include, but are not limited to, changing the number of processors in or used by client 210a (e.g., replacing a single-core motherboard with a multi-core motherboard or vice versa); changing the processor speed in the client 210a (e.g., going from a 1 million instructions per second (MIPS) processor to a 4 MIPS processor); changing the input/output (I/O) bandwidth used by client 210a, etc. Examples of changes to software include, but are not limited to, moving from one operation system (OS) to another; changing what other software applications are allowed to interface with a particular licensed unit of installed software (installed software is referred to as "inventory" in the present disclosure); etc. Examples of fundamental transformations include, but are not limited to, changing how many users are allowed to use client 210a; transforming client 210a from a physical device to a virtual machine; etc. Any of these described changes result in system 200a changing into system 200b of FIG. 2B, which now has a different network 204b of systems, including the changed client 210b. Such a change is likely to change and/or violate the terms of existing restrictive software licenses (referred to herein as entitlement data) found in entitlement data storage 212.

Figure 3:
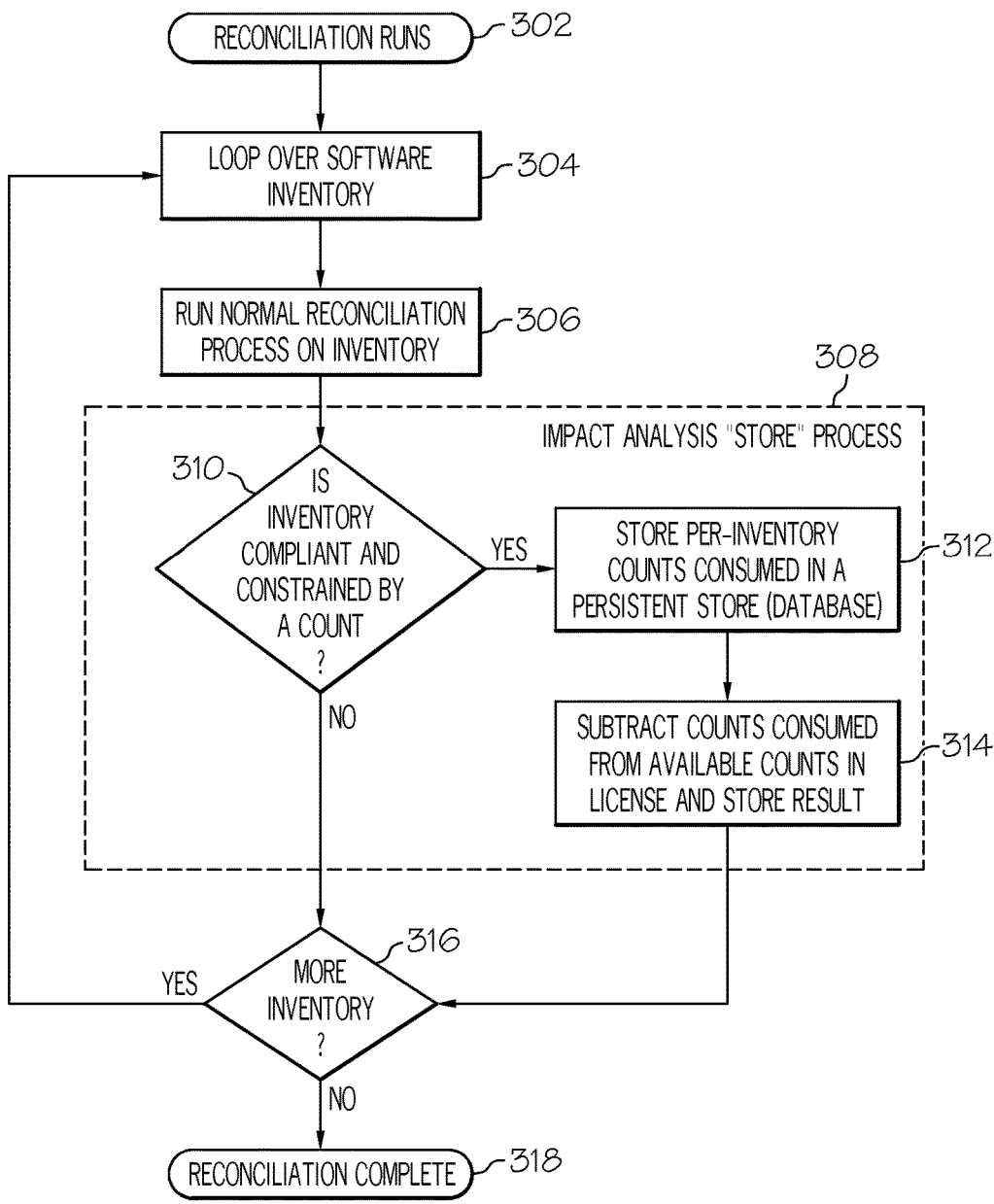
FIG. 3 is a high-level flow-chart of one or more exemplary steps executed by a processor to initialize a reconciliation between entitlement data and inventory data.

Referring now to FIG. 3, a high-level flow-chart of one or more exemplary steps executed by a processor to initialize a reconciliation between entitlement data and inventory data is presented. As described in initiator block 302, reconciliation runs are performed on an initial system (e.g., network 204a shown in FIG. 2). The reconciliation run process includes running a loop of reconciliation operations across all devices and software within a system, in order to determine the licensing status of the system. For example, such a reconciliation will determine how many licenses (if any) remain unused (referred to herein as a "count"), if there is any unauthorized software use (e.g., the software has been loaded onto too many machines, improperly configured machines, unauthorized machines, etc.), etc. (block 306). This initial process results in an impact analysis store process 308 ("store process 308"). The first part of store process 308 is determining if the inventory is compliant (query block 310). If not, then other steps are taken (e.g., ordering more licenses) as deemed necessary. However, as described in block 312, if the initial inventory is compliant, then per-inventory counts are stored in a persistent store, such as entitlement data storage 212 shown in FIG. 2. In accordance with how many counts are currently being used in the initial system, this count figure is adjusted up or down and stored (block 314). If there is no more inventory to examine (block 316), then reconciliation is complete and the process ends (terminator block 318).

Figure 4:
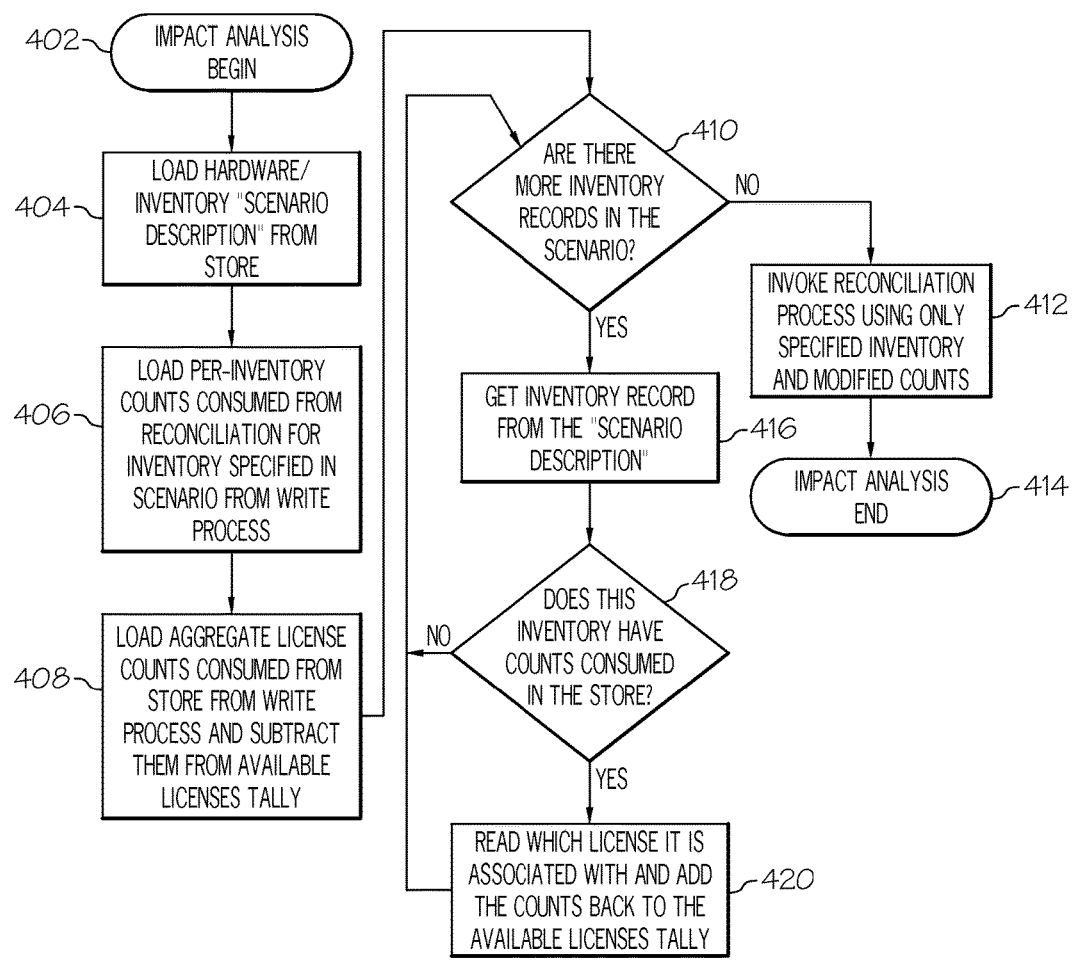
FIG. 4 is a high-level flow-chart of one or more exemplary steps executed by a processor to load an impact analysis using modified reconciliation data.

With reference now to FIG. 4, a high-level flow-chart of one or more exemplary steps executed by a processor to load an impact analysis using modified reconciliation data (i.e., an impact analysis "load" process) is presented. At initiator block 402, an impact analysis of a modified system is initiated. Changes to resources (e.g., the hardware, software, or fundamental transformations described above in FIG. 2) are loaded into a reconciliation program (block 404). The current number of counts (i.e., number of software licenses consumed/available) are loaded into this reconciliation program (block 406), and the count of licenses is reconciled in accordance with the changes made to the system (block 408). If there are no more inventory records to be reconciled in the new system (query block 410), then the count is finally reconciled (block 412) and the impact analysis ends (terminator block 414). However, if there are more inventory records in the scenario (query block 410), then an inventory record is obtained for those changed resources (block 416). If this inventory has counts available for the changes resources (query block 418), then that available license is assigned to the changed resource (block 420). Otherwise, other steps (not shown) are taken to add more licenses, change the nature of the resources, etc.

Figure 5A:
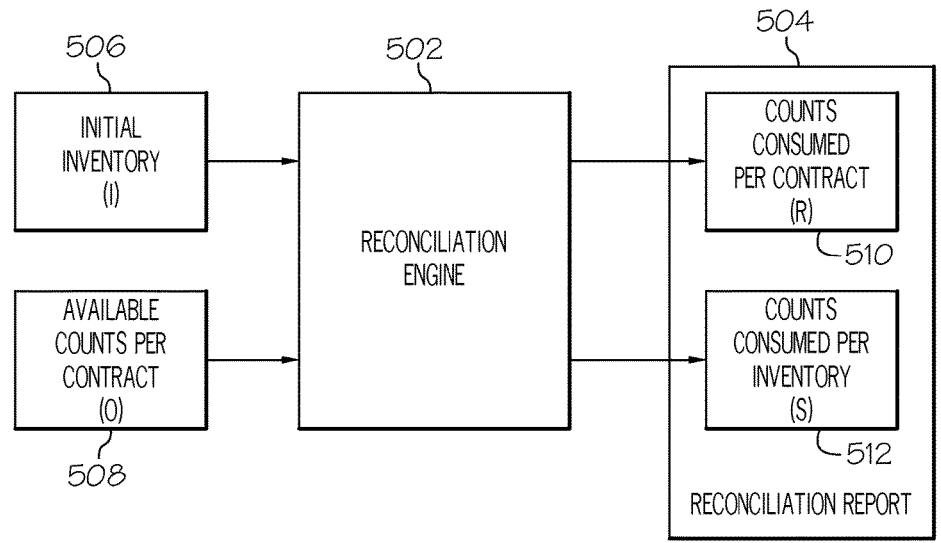
FIG. 5 is a high-level description of a reconciliation engine generating updated reconciliation reports in accordance with one embodiment of the present disclosure.
Figure 5B:
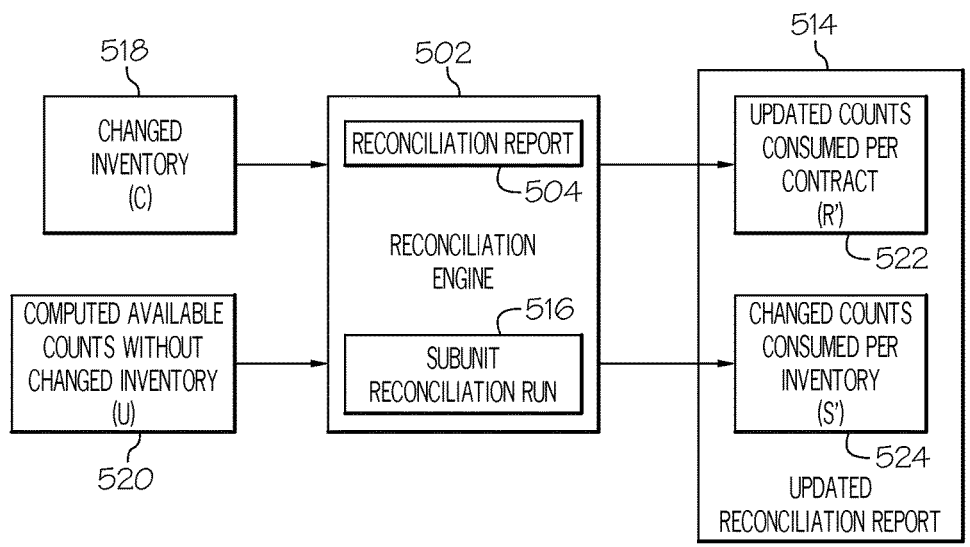

FIGS. 5A-B present a high-level description of a reconciliation engine generating updated reconciliation reports in accordance with one embodiment of the present disclosure. As depicted in FIG. 5A, a reconciliation engine creates an initial reconciliation report 504 utilizing the process described above in FIG. 3. Thus, an initial inventory (I) (506) of all installed software and hardware of the initial system, along with a count of available entitlements (O) (e.g., software licenses) (508) are input into the reconciliation engine 502. This results in the generation of an initial reconciliation report 504 for the entire initial system, and includes a report 510 of the total count of licenses consumed by contract for the initial system (R), and a report 512 of the total count of licenses consumed by inventory (S). That is, the reconciliation report 504 describes both how many licenses are consumed for each contract (R), which is independent of how many licenses are consumed by each unit of installed hardware/software (S), and how many licenses are consumed by each unit of installed hardware/software (S).

With reference now to FIG. 5B, when reconciliation engine 502 attempts to generate an updated reconciliation report 514, which considers the change(s) to the initial system described above, new inputs must be used, in order to avoid running a reconciliation report for the entire system (including the changed components). Thus, reconciliation engine 502 generates a subunit reconciliation run 516 using inputs that describe the changed subunit (C) (518), and a computed count of available licensing contracts available after changing the initial subunit (U) (520). In one embodiment, computed count (U) is equal to $O-R+\Sigma S_c$, where O is the initial count of licensing contracts available to the system, R is a count of licensing contracts consumed per contract by the system, and $\Sigma S_c$ is a sum of a difference in licensing contract counts consumed by all initial subunits minus licensing contract counts consumed by the changed subunit. The resulting subunit reconciliation run 516 is then incorporated into the initial reconciliation report 504 to create the updated reconciliation report 514, which includes a includes a report 522 of the total updated count of licenses (R') consumed by contract for the now-changed system, and a report 524 of the total count of licenses consumed by inventory (S') for the now-changed system. By utilizing the process described in FIGS. 5A-B, the count of licenses is kept correct, while avoiding the expense of running a new reconciliation report for the entire updated system.

Figure 6:
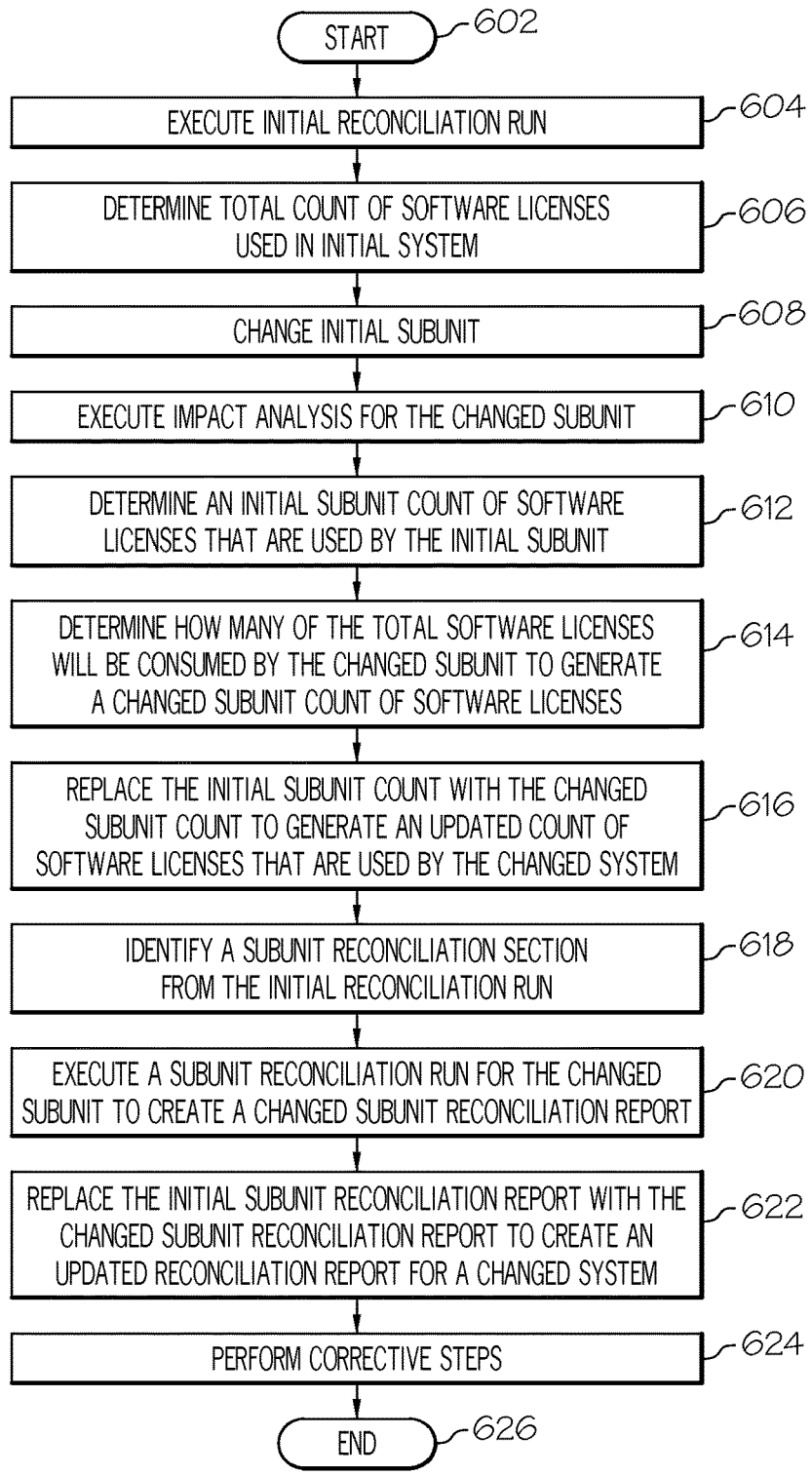
FIG. 6 is an overall high-level flow chart describing one or more exemplary steps performed by a processor to create an updated reconciliation report.

With reference now to FIG. 6, an overall high-level flow chart describing one or more exemplary steps performed by a processor to create an updated reconciliation report is presented. After initiator block 602, which may be invoked in response to a change to hardware, software, and/or overall configuration of a component of a system, a processor executes an initial reconciliation run for an initial system (block 604). This initial reconciliation run reconciles software licenses with installed software in the system to create an initial system reconciliation report that describes a level of licensing compliance within the initial system. The initial system reconciliation report comprises an initial subunit reconciliation report for an initial subunit, which is a component of the initial system. As described in block 606, a total count of software licenses available to and/or used by the initial system is determined. As described in block 608, one or more subunits of the system are then changed (e.g., the initial subunit is changed from a physical hardware unit to a virtual computing unit made up of software; the initial subunit's hardware is changed; the initial subunit changes from a single core machine to a multi core machine; the initial subunit has a hardware change that results in a change to the number of executable instructions per second that it can perform; etc.).

An impact analysis is executed for the changed subunit (block 610). This impact analysis ascertains what licensing impact will result from creating the changed subunit, as described above. As depicted in block 612, after determining a total count of software licenses that are used by the initial system, an initial subunit count of software licenses that are used by the initial subunit is determined. This initial subunit count is a portion of the total count of software licenses. A determination is made as to how many of the total software licenses will be consumed by the changed subunit to generate a changed subunit count of software licenses (block 614), and the initial subunit count is replaced with the changed subunit count to generate an updated count of software licenses that are used by the changed system (block 616).

As depicted in block 618, a subunit reconciliation section from the initial reconciliation run is identified, wherein the subunit reconciliation section reconciles software licenses for the initial subunit before the change to the initial subunit. A subunit reconciliation run for the changed subunit is executed to create a changed subunit reconciliation report (block 620). As described in block 622, the initial subunit reconciliation report is replaced with the changed subunit reconciliation report to create an updated reconciliation report for a changed system, wherein the changed system comprises the changed subunit, and wherein the updated reconciliation report describes a level of licensing compliance within the changed system. As described in block 624, the updated reconciliation report is compared with the initial reconciliation report. In response to this comparison, if a determination is made that the changed system is consuming more licenses than is authorized, the licensing management computer (e.g., element 202 shown in FIG. 2) automatically increasing the number of licenses for the changed system. The process ends at terminator block 626.

As described herein, a novel impact analysis uses a specially modified reconciliation engine that creates a set of data that can be specifically used for quickly identifying upgrade impacts without running a complete reconciliation process. After the data set is created, a separate process checks a user-entered "hardware change plan" and is able to identify reconciliation impacts using this process.

In one embodiment, a user describes a hardware/software inventory change scenario in which an impact analysis is required. Examples of such a change scenario include, but are not limited to, a system upgrade, a system removal, a system addition, a software decommission, or a software replacement. This change scenario is stored into a permanent store for later use. A specially modified reconciliation engine runs to identify the impacts to the software reconciliation that such a change might produce. This reconciliation engine stores the values that each software inventory record "consumes" out of each software license. The reconciliation engine also stores the total values "consumed" out of each license in the pool of available software licenses. An impact analysis engine then runs, resulting in a process that reads the output from the modified reconciliation engine and uses that output to create a view of the reconciliation that includes the portion that the user was interested in for impact analysis. The view is created by looping over each software license, subtracting the total counts consumed by the compliance process (counts may be anything that constrains a software contract in a numerical way, such as copies, MIPS, seats, users, etc). Then for each inventory record involved in the analysis scenario, it adds the counts consumed by the modified reconciliation engine back to the entitlement pool. This creates a view of the available entitlement that is equal to the current environment less the inventory involved in the scenario. This analysis engine then invokes the reconciliation engine that operates on that smaller view and finishes in a much shorter amount of time.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of managing software licenses, the computer-implemented method comprising:
    a processor executing an initial reconciliation run for an initial system, wherein the initial reconciliation run reconciles software licenses with installed software in the initial system to create an initial system reconciliation report, wherein the initial system reconciliation report describes a level of licensing compliance within the initial system, wherein the initial system reconciliation report comprises an initial subunit reconciliation report for an initial subunit, and wherein the initial subunit is a component of the initial system;
    executing, by the processor, a change to the initial subunit to create a changed subunit, wherein the change to the initial subunit is a change to which software applications are allowed to interface with a particular licensed unit of installed software on the initial subunit;
    executing, by the processor, an impact analysis for the changed subunit, wherein the impact analysis ascertains if a licensing impact will result from creating the changed subunit;
    identifying, by the processor, a subunit reconciliation section from the initial reconciliation run, wherein the subunit reconciliation section reconciles software licenses for only the initial subunit before the change to the initial subunit;
    executing, by the processor, a subunit reconciliation run for only the changed subunit to create a changed subunit reconciliation report; and
    replacing, by the processor, the initial subunit reconciliation report with the changed subunit reconciliation report to create an updated reconciliation report for a changed system, wherein the changed system comprises the changed subunit, and wherein the updated reconciliation report describes a level of licensing compliance for the changed system.

2. The computer-implemented method of claim 1, further comprising:
    determining, by the processor, a total count of software licenses that are used by the initial system;
    determining, by the processor, an initial subunit count of software licenses that are used by the initial subunit, wherein the initial subunit count is a portion of the total count of software licenses;
    determining, by the processor, how many of the total software licenses will be consumed by the changed subunit to generate a changed subunit count of software licenses; and
    replacing, by the processor, the initial subunit count with the changed subunit count to generate an updated count of software licenses that are used by the changed system.

3. The computer-implemented method of claim 2, further comprising:
    comparing, by the processor, the updated reconciliation report with the initial reconciliation report; and
    in response to said comparing determining that the changed system is consuming more licenses than authorized, automatically increasing, by the processor, the number of licenses for the changed system.

4. A computer program product for managing software licenses, the computer program product comprising:
    a non-transitory computer readable storage media;
    first program instructions to execute an initial reconciliation run for an initial system, wherein the initial reconciliation run reconciles software licenses with installed software in the initial system to create an initial system reconciliation report, wherein the initial system reconciliation report describes a level of licensing compliance within the initial system, wherein the initial system reconciliation report comprises an initial subunit reconciliation report for an initial subunit, and wherein the initial subunit is a component of the initial system;
    second program instructions to execute a change to the initial subunit to create a changed subunit, wherein the change to the initial subunit is a change to which software applications are allowed to interface with a particular licensed unit of installed software on the initial subunit;
    third program instructions to execute an impact analysis for the changed subunit, wherein the impact analysis ascertains if a licensing impact will result from creating the changed subunit;
    fourth program instructions to identify a subunit reconciliation section from the initial reconciliation run, wherein the subunit reconciliation section reconciles software licenses for only the initial subunit before the change to the initial subunit;
    fifth program instructions to execute a subunit reconciliation run for only the changed subunit to create a changed subunit reconciliation report; and
    sixth program instructions to replace the initial subunit reconciliation report with the changed subunit reconciliation report to create an updated reconciliation report for a changed system, wherein the changed system comprises the changed subunit, and wherein the updated reconciliation report describes a level of licensing compliance for the changed system; and wherein the first, second, third, fourth, fifth, and sixth program instructions are stored on the non-transitory computer readable storage media.

5. The computer program product of claim 4, further comprising:
seventh program instructions to determine a total count of software licenses that are used by the initial system;
eighth program instructions to determine an initial subunit count of software licenses that are used by the initial subunit, wherein the initial subunit count is a portion of the total count of software licenses;
ninth program instructions to determine how many of the total software licenses are consumed by the changed subunit to generate a changed subunit count of software licenses; and
tenth program instructions to replace the initial subunit count with the changed subunit count to generate an updated count of software licenses that are used by the changed system, and
wherein the seventh, eighth, ninth, and tenth program instructions are stored on the non-transitory computer readable storage media.

6. The computer program product of claim 4, wherein the first, second, third, fourth, fifth, and sixth program instructions are downloaded to the computer readable storage media from a remote software deploying server in an on-demand basis.

7. A computer system comprising:
a processor, a computer readable memory, and a non-transitory computer readable storage media;
first program instructions to execute an initial reconciliation run for an initial system, wherein the initial reconciliation run reconciles software licenses with installed software in the initial system to create an initial system reconciliation report, wherein the initial system reconciliation report describes a level of licensing compliance within the initial system, wherein the initial system reconciliation report comprises an initial subunit reconciliation report for an initial subunit, and wherein the initial subunit is a component of the initial system;
second program instructions to execute a change to the initial subunit to create a changed subunit, wherein the change to the initial subunit is a change to which software applications are allowed to interface with a particular licensed unit of installed software on the initial subunit;
third program instructions to execute an impact analysis for the changed subunit, wherein the impact analysis ascertains if a licensing impact will result from creating the changed subunit;
fourth program instructions to identify a subunit reconciliation section from the initial reconciliation run, wherein the subunit reconciliation section reconciles software licenses for only the initial subunit before the change to the initial subunit;
fifth program instructions to execute a subunit reconciliation run for only the changed subunit to create a changed subunit reconciliation report; and
sixth program instructions to replace the initial subunit reconciliation report with the changed subunit reconciliation report to create an updated reconciliation report for a changed system, wherein the changed system comprises the changed subunit, and wherein the updated reconciliation report describes a level of licensing compliance for the changed system; and
wherein the first, second, third, fourth, fifth, and sixth program instructions are stored on the non-transitory computer readable storage media for execution by the processor via the computer readable memory.

8. The computer system of claim 7, further comprising:
seventh program instructions to determine a total count of software licenses that are used by the initial system;
eighth program instructions to determine an initial subunit count of software licenses that are used by the initial subunit, wherein the initial subunit count is a portion of the total count of software licenses;
ninth program instructions to determine how many of the total software licenses will be consumed by the changed subunit to generate a changed subunit count of software licenses; and
tenth program instructions to replace the initial subunit count with the changed subunit count to generate an updated count of software licenses that are used by the changed system, and
wherein the seventh, eighth, ninth, and tenth program instructions are stored on the non-transitory computer readable storage media for execution by the processor via the computer readable memory.

9. The computer system of claim 8, further comprising:
eleventh program instructions to compare the updated reconciliation report with the initial reconciliation report; and
twelfth program instructions to, in response to said comparing determining that the changed system is consuming more licenses than authorized, automatically increase the number of licenses for the changed system, and
wherein the eleventh and twelfth program instructions are stored on the non-transitory computer readable storage media for execution by the processor via the computer readable memory.

* * * * *